United States Patent Office 3,277,032
Patented Oct. 4, 1966

3,277,032
BLENDS OF CELLULOSE TRIACETATE WITH METHYL ACRYLATE POLYMER
John R. Caldwell, Kingsport, Tenn., assignor to Eastman Kodak Company, Rochester, N.Y., a corporation of New Jersey
No Drawing. Original application Nov. 3, 1958, Ser. No. 771,187, now Patent No. 3,026,276, dated Mar. 20, 1962. Divided and this application Jan. 4, 1962, Ser. No. 164,420
3 Claims. (Cl. 260—17)

This is a divisional application of U.S. patent application Serial No. 771,187, filed November 3, 1958, now issued at Patent No. 3,026,276 on March 20, 1962.

This invention concerns a modification of cellulose triacetate with vinyl polymers in order to improve the cellulose triacetate fibers.

Cellulose triacetate is a well-known composition which may be used for preparing fibers for use in fabrics, and for sheeting which may be used for such purposes as photographic film base. However, it is desirable to modify the cellulose triacetate in order to improve certain of the characteristics of the material which are inherent in cellulose triacetate itself. For instance the cellulose triacetate is relatively insoluble in such solvents as acetone and the like which can normally be used with cellulose acetate. Moreover, cellulose triacetate is a relatively hard film material which must be plasticized in order to enable it to be used for various purposes such as film base, fibers, and the like. However, in order to plasticize this material, it has been desirous to find some means which would plasticize the material without exuding, evaporating or the like, with the result that the material becomes brittle.

I have found a method of modifying cellulose triacetate with vinyl polymers which provides improved solubility of the triacetate in such solvents as acetone and which also plasticizes the cellulose triacetate so that the plasticizer becomes an integral part of the final composition and will not wash out or exude, and which is inert to photographic emulsion.

One object of this invention is to provide a plasticized cellulose triacetate. Another object of the invention is to provide clear, stable solutions or dopes of cellulose triacetate and a vinyl polymer in a non-solvent for cellulose triacetate. A further object is to provide fibers and films of cellulose triacetate which can be dyed with the common types of dye by standard methods. A further object is to provide new cellulose triacetate compositions that are soluble in acetone. An additional object of the invention is to provide acetone solutions with cellulose triacetate. A further object of the invention is to provide a method for dissolving cellulose triacetate in acetone. Another object is to provide a method for manufacturing films and fibers of cellulose triacetate from acetone solutions. Still another object is to provide cellulose triacetate compositions that are soluble in esters, alcohols, and higher ketones.

To carry out my invention, I form a vinyl polymer in the presence of dissolved or swollen cellulose triacetate. Cellulose triacetate may be treated with a liquid which acts as a swelling or softening agent but is a non-solvent. The materials which may be used in my invention include water, acetic acid, and the like. The resulting blend can be converted directly to fibers or films by extrusion into a suitable precipitating bath. Thus a vinyl polymer may be formed in a solution of cellulose triacetate in a solvent other than acetic acid, such as dimethylsulfolane, ethylene chlorohydrin, methylene chloride, a methylene chloride-methanol mixture containing at least 50% methylene chloride and the like. The resulting solution can be used directly or may be treated with a precipitating agent to isolate the blend.

In another embodiment acetic acid may be used as a solvent for cellulose triacetate and an acetone-soluble vinyl resin blended with the cellulose triacetate in acetic acid solution. The blend is then precipitated to form an intimate mixture of the vinyl resin and cellulose triacetate. These precipitated mixtures will dissolve or disperse in acetone even when they contain as high as 85% triacetate. The acetone solutions can be spun by the usual dry-spinning methods to give fibers; they can be coated or cast to give clear, flexible films. Therefore, the modified cellulose triacetate may be used in conventional cellulose acetate equipment without changing the design appreciably.

When plasticizing the cellulose triacetate according to my invention, the vinyl material is incorporated as a monomer which is absorbed either in a solution of cellulose triacetate or in the swollen cellulose triacetate depending upon whether a solvent or non-solvent is employed. The vinyl monomer or mixture of vinyl monomers are polymerized after they have been added to the cellulose triacetate along with a catalyst, and allowed to penetrate into the gel structure of the triacetate.

In a preferred embodiment of my invention, cellulose triacetate is jelled or swollen using water. This form of triacetate structure is obtained by precipitating an acetic acid dope of triacetate in water. The precipitate is washed but not dried. In this form, particles of precipitate consist of a gel that contains a relatively large proportion of water. Monomers can diffuse into the particles readily and can then be polymerized in close association with the triacetate. When the precipitate is dried, a compatible mixture of vinyl resin and triacetate is obtained.

When the vinyl monomers are such that they will form acetone soluble vinyl polymers, and these vinyl monomers are used to modify cellulose triacetate according to my invention, and at least 15% of the material based on the total weight of modified cellulose triacetate is the vinyl polymer, the modified cellulose triacetate is acetone soluble. This effect may also be obtained by mixing the cellulose triacetate in acetic acid, then adding to it an acetone soluble vinyl polymer so that the resulting mixture contains at least 15% of the vinyl polymer. A particularly unexpected advantage of obtaining acetone soluble modified cellulose triacetate is in the crystallinity of the films cast from acetone solutions. Formerly crystallinity of cellulose triacetate was obtained by subjecting the cellulose triacetate to temperatures of 200° C. or higher. This feature is unexpected inasmuch as only a slight degree of crystallinity is obtained when these modified cellulose triacetate films are cast from methylene chloride-methanol solutions.

It will be understood, of course, that all of these modified cellulose triacetate blends are also soluble in the normal cellulose triacetate solvents, such as a methylene chloride-methanol mixture containing at least 50% methylene chloride; and they may be extruded or cast into films, fibers, coatings and the like from these solvents. A particularly valuable use of the campatible blends is the production of shaped articles by melt extrusion through spinnerets or other types of orifices. In such cases it is often desirable to incorporate from 15% to 30% of a solvent or swelling agent such as triethylene glycol, butyl acetate, etc., to the lower the extrusion temperature.

A wide variety of vinyl polymers may be employed in the process of this invention, including homopolymers and copolymers. Suitable polymers are obtained by employing monoethylenically unsaturated polymerizable compounds containing a C=C group or more specifically a $CH_2$=C group.

Examples of suitable monomers include maleamides, and maleamates. Fumaric acid derivatives may also be used. Itaconic and citraconic esters, amides, and ester amides can be used as well as vinyl ethers, vinyl esters and vinyl ketones. The vinyl derivatives of benzene are operative as represented by styrene, para methyl styrene and alpha acetoxystyrene. Unsaturated acids such as acrylic, methacrylic, maleic, fumaric, itaconic, citraconic, and their esters can be used as well as other monomers including methacrylonitrile, acrylonitrile, isopropenyl acetate, N-vinyl imides, N-vinyl lactams, fluorinated compounds, vinylpyridines, vinyl sulfones, vinyl chloride, vinylidine chloride and vinylidine cyanide.

Amides of acrylic and methacrylic acids are of particular value when used in the form of homopolymers or copolymers. Several examples include those represented by the general formula as follows:

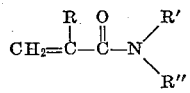

R is H or methyl. R' is H, alkyl containing 1–4 carbon atoms, phenyl, beta-hydroxyethyl, or beta-hydroxypropyl. R'' is H, alkyl containing 1–4 carbon atoms, phenyl, beta-hydroxyethyl, or beta-hydroxypropyl. R' and R'' may be combined to form a cyclic structure such as is found in morpholine, piperidine and pyrrolidine. The acrylic and methacrylic amides of hydrazine and hydrazine derivatives are also operative. The composition of the vinyl resin is selected so that a polymer of the vinyl resin would be soluble in the solvent intended for processing cellulose triacetate such as, for instance, acetone, esters, higher ketones and the like.

In the event that the polymer is prepared prior to mixing with cellulose triacetate, it may be prepared by the standard emulsion, bead, or bulk processes, using the commonly known catalysts. The polymer may then be mixed with the cellulose triacetate in acetic acid solution or by other means described below.

In a preferred embodiment of the invention in preparing a mixture of the vinyl polymer and cellulose triacetate, the vinyl resin is prepared in acetic acid and the resulting solution is mixed with an acetic acid solution of cellulose triacetate. In some cases it may be desirable to prepare the vinyl resin in an acetic acid solution of the cellulose triacetate. Whether the modified cellulose triacetate is prepared by a mixture of the polymer and the triacetate or whether the vinyl polymer is actually polymerized in the dissolved cellulose triacetate or swollen or gelled cellulose triacetate, the modified cellulose triacetate can be prepared so that it will be soluble in acetone or in some other preferred solvent.

From 60% to 85% cellulose triacetate may be present along with 40% to 15% of the acetone soluble vinyl polymer based on the total solvents content. Other mutual solvents which may be used for cellulose triacetate and a vinyl resin include dimethyl formamide, dimethyl acetamide, gamma butyrolactone, methylene chloride, 80 methylene chloride-20 methanol and the like.

Suitable precipitants for obtaining the modified cellulose triacetate include water, benzene, lower alcohols, and the like when used with acetic acid. Other precipitants would be easily selected by one familiar with the art.

Pigments such as carbon black, titanium dioxide, iron oxide, phthalocyanine dyes and the like may be added to the solutions. Plasticizers, fire-proofing agents, etc., can also be added. Agents to improve the dyeing properties can be added as represented by poly N-isopropylacrylamide, poly dimethylacrylamide, polyvinylpyridine, etc.

In some cases, it is advantageous to incorporate in the blend a small amount of high-boiling swelling agent or solvent for the vinyl polymer. In order to improve the solubility of the blend in acetone, esters, and the like, suitable additives include diethylene glycol, triethylene glycol, ethoxyethoxyethanol, and butoxyethoxyethanol.

The following examples are intended to illustrate my invention but not intended to limit it in any way:

Example 1

Five grams cellulose triacetate (43.5% acetyl) was dissolved in a mixture of 80 cc. acetic acid and 20 cc. water. Then 3 grams of N-isopropylacrylamide, 2 grams of acrylonitrile, 0.1 gram potassium persulfate, and 0.1 gram sodium bisulfite were added to the solution and the mixture was stirred at 50/60° C. for 18 hours. The resulting dope was poured into water to precipitate the cellulose triacetate and the N-isopropylacrylamide copolymer as an intimate mixture. After the precipitate had been washed free of acetic acid, it was stirred with a solution of 0.75 gram diethylene glycol and 25 cc. of water, then dried at 50–60° C.

The product gave a smooth, gel-free dope in acetone at a concentration of 20–25% solids. Fibers were spun from the dope by the dry-spinning process. They dyed well with acid wool dyes, direct cotton dyes and cellulose acetate dyes.

Example 2

One part of the blend prepared in Example 1, as the original acetic acid dope, was mixed with one part of cellulose triacetate in acetic acid solution. The mixture was precipitated with water to give a product that consisted of three parts cellulose triacetate and one part N-isopropylacrylamide copolymer. This blend gave a smooth, stable dope in acetone at a concentration of 20–22% solid.

Fibers were spun from the acetone solution by the dry-spinning process. The fibers were drafted 200–400% in a hot air chamber. They dyed well with cellulose acetate dyes, acid wool dyes, and premetallized dyes. Fibers had a hot bar sticking temperature of 230° C. which is about 30° C. higher than the sticking temperature of fibers made from acetone-soluble cellulose acetate.

Example 3

Five grams of cellulose triacetate (43.6% acetyl) were dissolved in a mixture of 80 cc. acetic acid and 20 cc. of water. Three grams of methyl acrylate, 2 grams of acrylonitrile, 0.1 gram potassium persulfate, and 0.1 gram sodium bisulfite were added. The mixture was stirred at 50–60° C. for 18 hours. The dope was then poured into water to precipitate the cellulose triacetate and the methyl acrylate copolymer as an intimate mixture.

The product was dissolved in acetone to give a smooth, stable dope having a dissolved solid content of 24%. Clear, tough films were cast from the acetone solution. The films were useful as photographic film base. They had a crystalline structure as shown by X-ray.

Example 4

A solution of 60 grams vinyl acetate, 40 grams methyl acrylate and 2 grams of benzoyl peroxide in 300 grams of acetic acid was heated at 90–100° C. for 12 hours to produce a clear, viscous dope or solution of copolymer. The solution was mixed with a solution of 300 grams of cellulose triacetate and 3000 cc. of acetic acid and the mixture was poured into water. The precipitate was washed and dried.

The product gave a smooth, stable dope in acetone with a solids content of 22–25%. Films cast from the acetone solution were useful as photographic film base. The blend was also soluble in ethyl acetate.

Films cast from the acetone solution of the blend showed a high degree of crystallinity when examined by X-ray. The hot bar sticking temperature of the film was 250–260° C.

Fibers were spun by extruding the acetone solution into a hot air chamber. The fibers showed only a slight degree of crystallinity. After drafting 200–300% in a hot air chamber, the fiber showed a high degree of orientation and crystallinity. It had a hot bar sticking temperature of 230–240° C.

Example 5

A solution of 100 grams of methoxyethyl methacrylate and 1.5 grams benzoyl peroxide in 300 cc. of acetic acid was heated at 90–100° C. for 8 hours. The viscous solution was mixed with a solution of 200 grams cellulose triacetate (43.5% acetyl) in 3000 grams of acetic acid. The blend of cellulose triacetate and methacrylic ester resin was precipitated by pouring the acetic acid solution into water. The precipitate was washed and dried.

The blend was soluble in acetone and gave clear films when the solvent was evaporated. Solutions of the blend in ethylacetate were useful for making protective coatings.

Example 6

A solution of 100 grams methyl acrylate and 1.0 gram benzoyl peroxide in 300 grams of acetic acid was heated at 50–60° C. for 24 hours. The viscous solution was mixed with a solution of 400 grams cellulose triacetate (43.2% acetyl) in 4000 grams of acetic acid. The blend of cellulose triacetate and polymethyl acrylate was precipitated by pouring into water. The precipitate was washed and dried.

The blend was dissolved in acetone at about −15° C. to give a clear, smooth dope. The dope was stable at room temperature for several days. Films cast from the dope were clear and showed a high degree of crystallinity when examined by X-ray. The strength of the film was increased by drafting 150–300% at an elevated temperature.

Fibers were spun by extruding the acetone dope into a hot air chamber. After the fibers had been drafted at an elevated temperature, followed by heat treatment at 200–250° C., they gave a crystalline X-ray pattern.

Films cast from a solution in 90 methylene chloride–10 methanol were non-crystalline. However, they developed a crystalline pattern when heated for a few minutes at 200–240° C. Fibers spun from a solution in methylene chloride-methanol were non-crystalline but they developed a crystalline pattern when drafted and heat treated.

Example 7

Forty grams of methyl acrylate, 60 grams, N,N-diethylacrylamide, 2 grams benzoyl peroxide, and 400 grams cellulose triacetate were dissolved in 4000 grams of acetic acid and the mixture was stirred at 60–70° C. for 24 hours. The resulting solution was poured into water to precipitate an intimate mixture of cellulose triacetate and the copolymer.

The blend was soluble in acetone. Fibers spun from the acetone solution were drafted and heat-set. They dyed readily with cellulose acetate dyes, acid wool dyes, and direct cotton dyes.

Example 8

A solution containing 14 milliliters of 10% gelatin, 1 milliliter of 7.5% saponin, and 10 milliliters of water is added to 5 milliliters of medium speed silver bromoiodide emulsion and the mixture is coated to a wet thickness of 0.006-inch on a sub-modified cellulose triacetate support, cast from the composition described in Example 7 and dried. The coating is then exposed under an image and developed in a N-methyl-p-aminophenol (or Metol)-hydroquinone developing composition to form a negative silver image. The residual silver halide is removed with hypo, leaving a permanent negative silver image. Color emulsions containing incorporated couplers may also be coated on this support and processed to yield dye images.

Example 9

Cellulose triacetate (43.5% acetyl) was prepared in a two acetic acid-one acetic anhydride solution by the usual method employing sulfuric acid as a catalyst. The ester was precipitated as fine gel particles by the addition of water. The precipitate was washed free of acetic acid and was then suspended in water to give a ratio of 20 g. cellulose triacetate [on a dry basis] to 130 g. water. The following materials were added to the suspension: 1.5 g. sulfonated mineral oil, 30 g. methyl acrylate, and 0.3 g. potassium persulfate. The mixture was stirred at 50–60° C. for 24 hours. The product, after filtering and drying, weighed 48 g. and consisted of an intimate blend of cellulose triacetate and polymethyl acrylate in approximately a 40–60 ratio.

The blend gave a clear, stable dope in 90 methylene chloride–10 methanol and clear, flexible, strong films were obtained by casting on glass plates.

One part of the blend and 2 parts cellulose triacetate were dissolved in 15 parts 90 methylene chloride–10 methanol to give a smooth, stable dope. Fibers were spun by the dry-spinning method and drafted 50% at an elevated temperature. The fibers, which contained approximately 20% polymethyl acrylate, dyed heavily with cellulose acetate dyes at the boil. They had a hot bar sticking temperature of 240–250° C.

This composition (80–20) is also useful as a photographic film base. The polymethyl acrylate imparts flexibility.

Example 10

Thirty grams N-isopropylacrylamide, 20 g. methyl acrylate, and 1.0 g. benzoyl peroxide were added to a solution of 200 g. cellulose triacetate 43.7% acetyl in 1500 cc. of acetic acid. The solution was stirred at 60–70° C. for 24 hours. The blend of cellulose triacetate and vinyl resin was precipitated by pouring the acetic acid solution into water. After washing and drying, the product gave a smooth, stable dope in 90 methylene chloride–10 methanol. Fibers spun from the dope dyed well with cellulose acetate dyes, acid wool dyes, and premetallized dyes.

Example 11

A solution containing 75 parts cellulose triacetate, 15 parts dimethylacrylamide, 10 parts N-tert-butylacrylamide, 0.5 part potassium persulfate, 850 parts acetic acid, and 150 parts water was stirred at 60–70° C. for 24 hours. The blend of cellulose triacetate and vinyl polymer was precipitated by pouring the acetic acid solution into water. The blend was ground to a particle size of 100 mesh and 75 parts was mixed with 25 parts of triethylene glycol. The mixture was extruded through a spinneret at 200–220° C. After the glycol was washed out, the fibers dyed well with cellulose acetate dyes, acid wool dyes, and premetallized dyes.

Example 12

Eighty parts of cellulose triacetate, 20 parts of N,N-dibutylacrylamide, 1 part of benzoyl peroxide, 200 parts of acetic acid, and 200 parts of water were stirred at 50–60° C. for 24 hours. The cellulose triacetate did not dissolve, but swelled appreciably so that the N,N-dibutylacrylamide diffused into the particles and polymerized. The product was isolated by pouring into water. Fibers spun from the blend dyed well with cellulose acetate dyes, acid wool dyes, and premetallized dyes.

Example 13

One part of cellulose triacetate, one part of N,N-diethylacrylamide, 0.02 part acetyl peroxide, 9 parts methylene chloride, and 1 part methyl alcohol were mixed until a clear solution was obtained. The solution was then heated at 50° C. for 24 hours. The solution containing triacetate and vinyl polymer was mixed with a solution of 4 parts cellulose triacetate dissolved in 14.4 parts methylene chloride and 1.6 parts methyl alcohol. Fibers spun from the resulting mixture dyed well with cellulose acetate dyes, acid wool dyes, and premetallized dyes.

Cellulose triacetate differs considerably from cellulose esters as usually intended by the use of that term. For instance, cellulose triacetate is insoluble in acetone and has a melting point about 40° C. higher than the material normally called cellulose acetate. Moreover, cellulose triacetate can be crystallized while cellulose acetate is usually considered to be in an amorphous state. The fundamental difference between triacetate and other cellulose esters is discussed by Malm, et al., Industrial and Engineering Chemistry, 43 684 (1951); and also in "An Introduction to the Chemistry of Cellulose" by Marsh and Wood, page 201.

Cellulose triacetate is known to be very incompatible with practically all types of vinyl polymers, and solutions or dopes containing the two materials separate into two layers on standing. This is especially true when the usual spinning or coating solvent 90% methylene chloride–10% methanol is used. In contrast to this, my process makes it possible to obtain clear, stable dopes that contain cellulose triacetate in combination with a variety of vinyl polymers.

As used therein the term "cellulose triacetate" refers to a cellulose ester containing more than 43% acetyl. Such an ester is highly insoluble in acetone and melts in the range of 275–300° C. as compared with 240–250° for the acetone soluble type. Cellulose triacetate develops a highly crystalline structure when subjected to suitable heat treatment.

The compositions to be operative in my invention may contain 20–95% cellulose triacetate to have improved properties. In the event that an amount of modifier less than 5% is used, the beneficial effect such as plasticizing, dyeing and the like are not obtained. In the event that an amount of modifier greater than 80% is used, the resulting material has poor physical properties such as tenacity, extensibility, and resistance to temperature change.

Fibers spun from solutions containing this modified cellulose triacetate can be dyed to heavy shades with cellulose acetate dyes, acid wool dyes, direct cotton dyes, and premetallized dyes. Standard procedures can be used since it is not necessary to dye at pressures above atmospheric. Swelling agents or dying assistants are not required.

Proportions designated herein are by weight unless otherwise indicated.

I claim:
1. A process for forming a blend of a cellulose triacetate and polymethyl acrylate which comprises the steps of
   (a) blending together ingredients consisting essentially of: (1) 40 weight percent of a cellulose triacetate having more than 43% acetyl content and (2) 60 weight percent of methyl acrylate, said blending being performed in the presence of a liquid selected from the group consisting of acetic acid, methylene chloride, methylene chloride-methanol solution, dimethyl-sulfolane, ethylene chlorohydrin, and water; and
   (b) polymerizing said methyl acrylate in the presence of said cellulose triacetate to form said blend.
2. A process for forming a blend of a cellulose triacetate and polymethyl acrylate which comprises the steps of
   (a) blending together ingredients consisting essentially of: (1) 40 weight percent of a cellulose triacetate having more than 43% acetyl content and (2) 60 weight percent of methyl acrylate, said blending being performed in the presence of acetic acid;
   (b) polymerizing said methyl acrylate in the presence of said cellulose triacetate to form said blend; and
   (c) separating said blend of a cellulose triacetate and polymethyl acrylate from said acetic acid.
3. A process for forming a blend of a cellulose triacetate and polymethyl acrylate which comprises the steps of
   (a) blending together ingredients consisting essentially of: (1) 40 weight percent of a cellulose triacetate having more than 43% acetyl content and (2) 60 weight percent of methyl acrylate, said blending being performed in the presence of water;
   (b) polymerizing said methyl acrylate in the presence of said cellulose triacetate to form said blend; and
   (c) separating said blend of a cellulose triacetate and polymethyl acrylate from said water.

References Cited by the Examiner
UNITED STATES PATENTS

| | | | |
|---|---|---|---|
| 2,698,242 | 12/1954 | Saner | 96—87 |
| 2,849,330 | 8/1958 | Hoffman et al. | 260—17 |
| 2,852,378 | 9/1958 | Nadeau et al. | 96—87 |
| 2,865,872 | 12/1958 | Hagemeyer et al. | 260—17 |
| 2,922,768 | 1/1960 | Mino et al. | 260—17 |
| 3,037,948 | 6/1962 | Landler et al. | 260—17 |
| 3,070,558 | 12/1962 | Coover | 260—17 |
| 3,076,771 | 2/1963 | Coover | 260—17 |
| 3,189,664 | 6/1965 | Nozaki | 260—17 |

OTHER REFERENCES

Ott et al.: "Cellulose," Part II, High Polymers, vol. V, 2nd edition, published by Interscience Publishers, New York, 1954, pages 794 and 795.

JOSEPH L. SCHOFER, *Primary Examiner.*

NORMAN G. TORCHIN, JAMES A. SEIDLECK,
*Examiners.*

J. T. BROWN, *Assistant Examiner.*